C. BERGENER.

LAMP AND LANTERN.

APPLICATION FILED OCT. 13, 1908.

12,893.

Reissued Dec. 15, 1908.

3 SHEETS—SHEET 1.

Witnesses:
H. G. Dimond.
E. A. Volk.

Inventor
Charles Bergener,
Wilkelm, Parker & Hard,
Attorneys.

C. BERGENER.

LAMP AND LANTERN.

APPLICATION FILED OCT. 13, 1908.

12,893. Reissued Dec. 15, 1908.

3 SHEETS—SHEET 2.

Witnesses:

A. G. Dimond.

E. A. Uplk.

by Charles Bergener, Inventor.

Wilhelm, Parker & Hard,

Attorneys

C. BERGENER.

LAMP AND LANTERN.

APPLICATION FILED OCT. 13, 1908.

12,893. Reissued Dec. 15, 1908.

3 SHEETS—SHEET 3.

Witnesses:
A. G. Dimond.
E. A. Volk.

Inventor
Charles Bergener,
by Wilhelm, Parker & Hard,
Attorneys

UNITED STATES PATENT OFFICE.

CHARLES BERGENER, OF ROCHESTER, NEW YORK, ASSIGNOR TO THE C. T. HAM MANUFACTURING COMPANY, OF ROCHESTER, NEW YORK.

LAMP AND LANTERN.

No. 12,893. Specification of Reissued Letters Patent. Reissued Dec. 15, 1908.

Original No. 833,951, dated October 23, 1906, Serial No. 336,511. Application for reissue filed October 13, 1908. Serial No. 457,577.

*To all whom it may concern:*

Be it known that I, CHARLES BERGENER, a citizen of the United States, residing at Rochester, in the county of Monroe and State of New York, have invented a new and useful Improvement in Lamps and Lanterns, of which the following is a specification.

This invention relates mainly to that class of lamps or lanterns which are designed for use on vehicles and which are provided with a metallic flame-chamber into which the burner projects and which is provided with a reflector, and which have air-inlet contrivances near the top of the chimney from which the air for the support of the flame descends through a passage outside of the flame-chamber.

The objects of the invention are to improve the construction of the body of the lamp or lantern so as to form a tight and satisfactory air-passage and at the same time render the interior of the body readily accessible and the structure simple and durable; also, to improve the construction of the lantern-top with a view of perfecting the operation of the devices whereby the supply of air to the burner is effected or controlled under the varying conditions of movement and exposure to air currents to which the lamp or lantern may be subjected; also, to improve the connection of the air passage of the body with the burner; also, to improve the construction of the reflecting devices; also, to provide simple and reliable means for securing the oil pot to the body of the lamp or lantern in such manner that the oil pot it not liable to become accidentally detached under the jarring which the lamp or lantern receives in use, while it can be readily and conveniently removed and applied when required.

Figure 1:
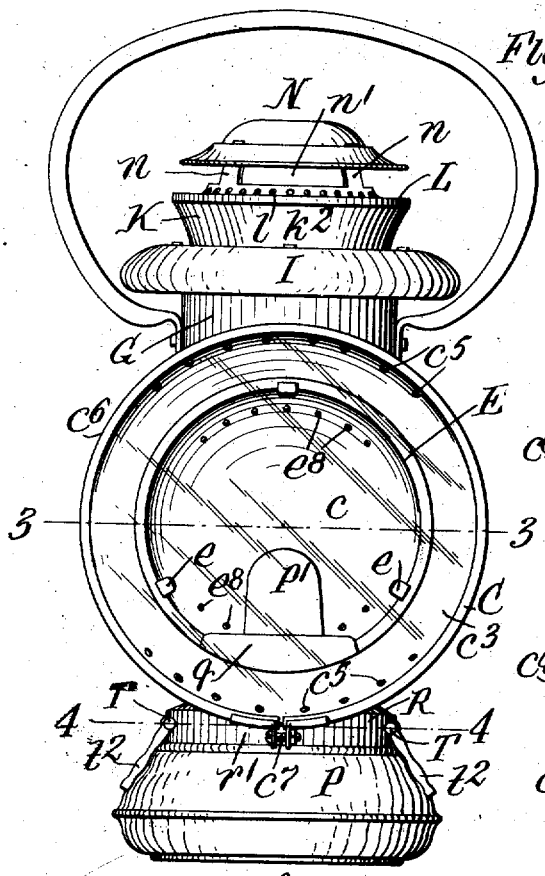
Figure 2:
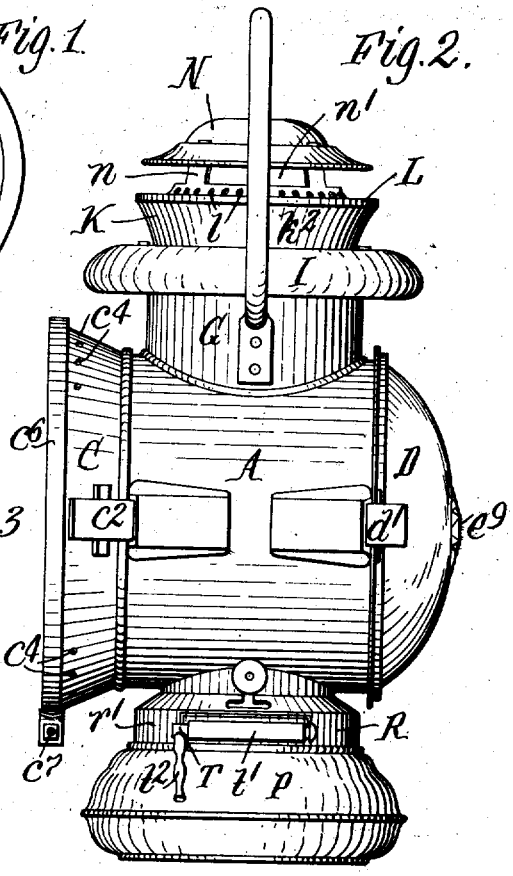
Figure 3:
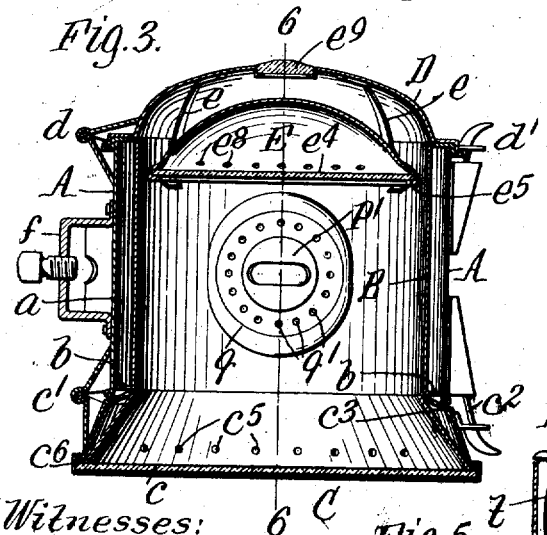
Figure 4:
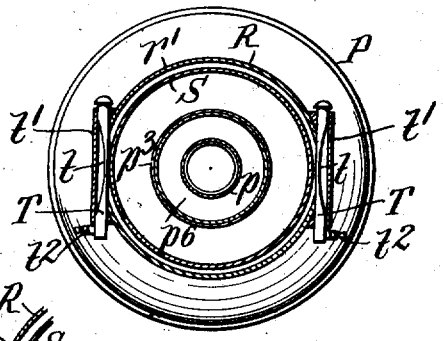
Figure 5:
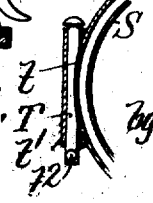
Figure 6:
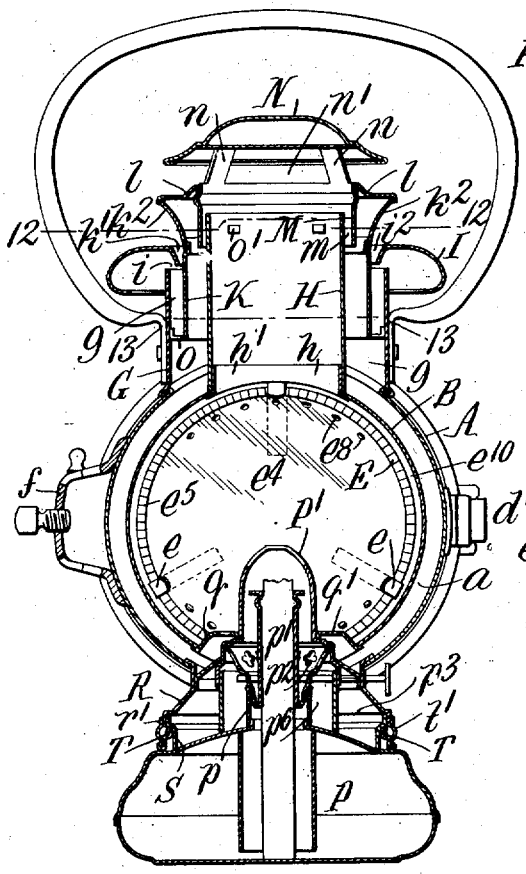
Figure 7:
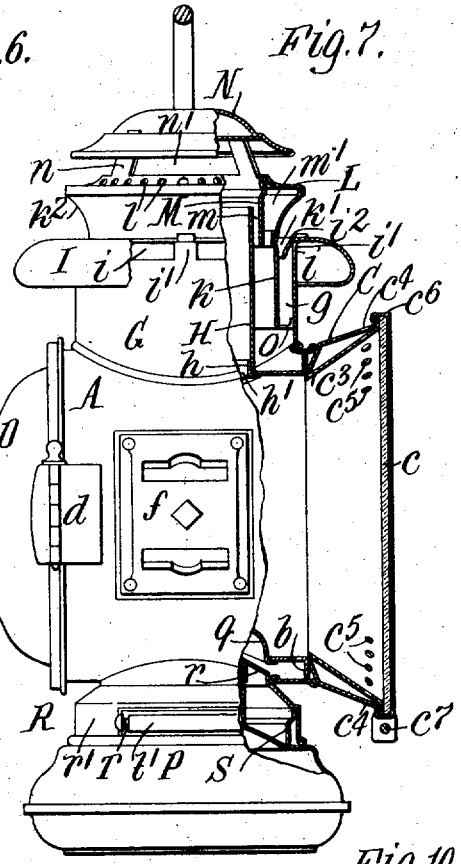
Figure 8:
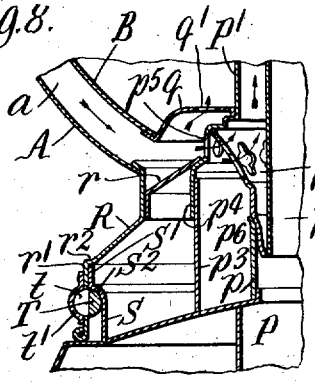
Figure 9:
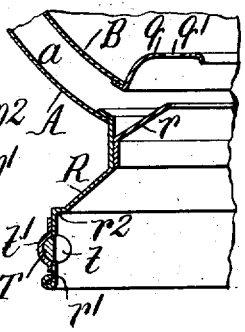
Figure 10:
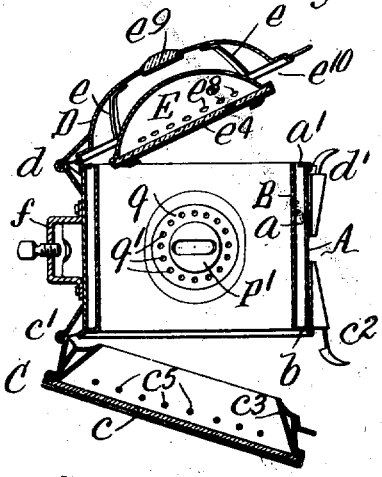
Figure 11:
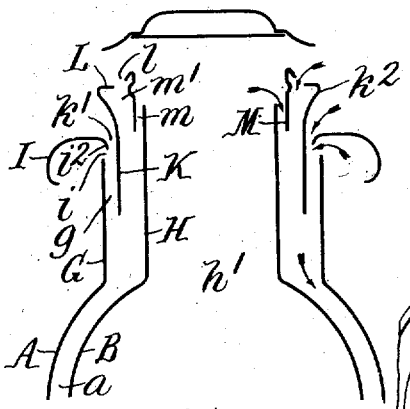
Figure 14:
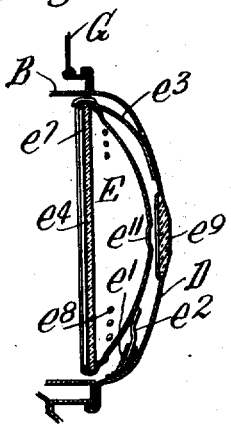
Figure 15:
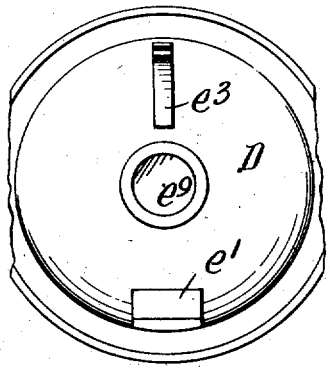
Figure 12:
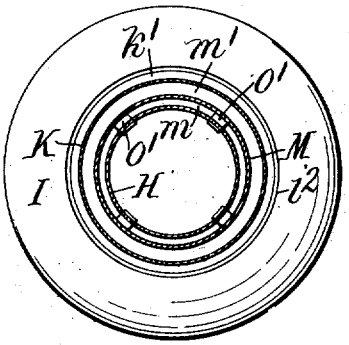
Figure 17:
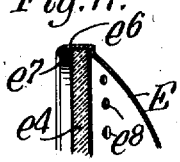
Figure 16:
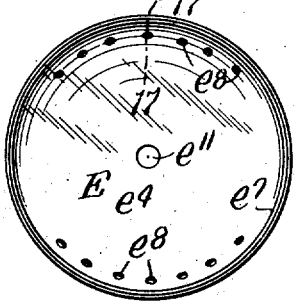
Figure 18:
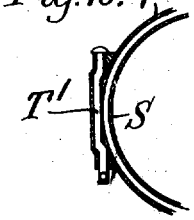
Figure 13:
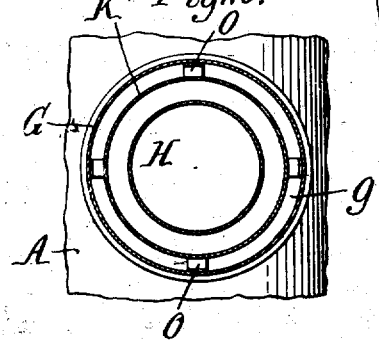

In the accompanying drawings, consisting of three sheets: Figure 1 is a front elevation of a vehicle lamp provided with my improvements. Fig. 2 is a side elevation thereof. Fig. 3 is a horizontal section in line 3—3, Fig. 1. Fig. 4 is a horizontal sectional view through the fastening devices of the oil-pot in line 4—4, Fig. 1, showing the locking bolts in their locked position. Fig. 5 is a fragmentary horizontal sectional view through one of these locking bolts in its released position. Fig. 6 is a vertical cross-section of the lamp in line 6—6, Fig. 3. Fig. 7 is a partly sectional side elevation of the lamp viewed from the side opposite to that shown in Fig. 2. Fig. 8 is a fragmentary vertical section, on an enlarged scale, of that portion of the lamp which contains the burner. Fig. 9 is a similar view with the oil-pot and burner removed. Fig. 10 is a horizontal section of the lamp similar to Fig. 3, but on a reduced scale and showing the front glass frame and the back plate opened. Fig. 11 is a fragmentary diagrammatic view of the lamp top. Figs. 12 and 13 are horizontal sections through the top of the lamp in lines 12—12 and 13—13, Fig. 6, respectively. Fig. 14 is a vertical section showing a modified attachment of the reflector to the back plate. Fig. 15 is a front view of this back plate. Fig. 16 is a front view of the back reflector, showing a modified construction thereof. Fig. 17 is a fragmentary vertical section in line 17—17, Fig. 16, on an enlarged scale. Fig. 18 is a horizontal section showing a modified construction of the locking bolt.

Like letters of reference refer to like parts in the several figures.

The body of the lamp or lantern has the form of a hollow horizontal double-walled cylinder or barrel which is open at the front and rear and to which are hinged a front frame, containing the front glass, and a back frame, carrying the rear reflector. The open-ended cylindrical body is composed of an outer horizontal cylindrical or tubular wall A and an inner similar wall or lining B, of somewhat smaller diameter, forming between them a cylindrical or annular air-passage *a*. The latter is closed at the front and rear by any suitable means, for instance, as shown, by an annular flange *b*, formed on or secured to the inner wall B and projecting outwardly from the latter to the outer wall A, and at the rear by a similar flange $a^1$, formed on or secured to the outer wall A and projecting inwardly to the inner wall B. The latter is preferably removably inserted into the outer wall A from the front and is plated on its inner side to operate as a reflector.

C represents the annular front frame, which contains the front glass *c*, and is hinged at $c^1$ to one side of the lamp body. The latter is provided at the opposite side with the usual spring catch $c^2$ for holding the front frame closed. This frame is provided with an internal forwardly-flaring reflector $c^3$, forming with the surrounding frame a hollow annular structure. This reflector is removably arranged in the frame, whereby the plating of the reflector is simplified. The frame and the reflector are preferably provided near the glass with upper and lower perforations $c^4$ $c^5$, respectively, to permit of a circulation of air on the inner side of the glass and prevent sweating of the same. The glass is secured to the rim of the frame by any suitable fastening, for instance, by a divided ring $c^6$ and clamp-screw $c^7$, Figs. 1, 2 and 7.

The back plate D is preferably made concave on its front side and hinged at one side to the body A, as shown at $d$, and secured at the other side by a spring catch $d^1$ or is otherwise movably attached. This plate carries on its front side a concave reflector E, which may be secured to the back plate in various ways. In the construction represented in Figs. 3, 6 and 10 the back plate is provided with diverging spring arms $e$, which yieldingly grasp the rim of the reflector, while in the construction represented in Figs. 14 and 15 the back plate is provided at its lower front side with a socket $e^1$ for the reception of a tang or arm $e^2$, secured to the rear side of the reflector, and the upper portion of the reflector is engaged by a spring arm $e^3$ on the back plate. Either construction permits the ready removal of the reflector from the back plate. The reflector has its face side preferably covered with a protecting glass plate $e^4$, which is applied to the rim or marginal portion of the reflector and is removably held in place by any suitable means. In the construction represented in Figs. 3 and 6 the rim of the reflector is slitted and bent over the glass plate, as indicated at $e^5$, while in the construction represented in Figs. 16 and 17 the rim of the reflector is provided with an annular groove $e^6$, in which the glass plate is held by a divided wire ring $e^7$. The reflector is preferably provided near the glass plate with upper and lower perforations $e^8$, which permit a circulation of air through the space between the reflector and the glass plate for keeping the plate cool and clear. The back plate is preferably provided in rear of the reflector with a lens or jewel $e^9$, which may be illumined in various ways. In the construction represented in Figs. 3 and 10 the reflector is somewhat smaller in diameter than the inner wall or lining B of the body and leaves an annular space $e^{10}$ around its margin through which light is diffused rearwardly to the lens. In the construction represented in Figs. 14 and 16 the reflector is provided with a small central opening $e^{11}$, through which light passes directly to the lens or jewel. The tubular body wall A may be provided at one side with the usual attaching socket $f$ or other attaching means. The horizontal cylindrical form of the inner wall B of the lamp body provides a flame-chamber of comparatively large size which holds an ample body of air, whereby the combustion is improved, and in which the surfaces of the inner cylindrical reflecting wall and of the rear reflector are so far distant from the flame that they are not liable to be injured by heat or obscured by smoke or soot. The air passage which envelops this cylindrical reflecting wall B is of uniform width from the front to the rear end of this wall and is unobstructed, forming a passage of large carrying capacity, although comparatively shallow.

The upper portion of the lamp or lantern structure, which contains the contrivances for admitting the air and emitting the products of combustion, is constructed as follows: G represents an upright cylinder forming the outer wall of a descending annular air passage $g$. This vertical cylindrical wall is secured upon the horizontal cylindrical wall A of the body portion by any suitable means in such manner that the air passage $g$ connects with the cylindrical or annular air passage $a$ between the body wall A and its lining B. H represents the metallic chimney which is arranged centrally within the upright wall G and which joins at its lower end the upper portion of the inner horizontal wall or lining B of the body portion. This lining is preferably provided with a short upwardly-projecting collar $h$, which surrounds the opening $h^1$ in the lining, through which the products of combustion escape therefrom and which projects into the lower portion of the chimney H and bridges the joint between the latter and the lining B. The collar $h$ is made so short that the lining B can be inserted into the outer body wall A and the collar $h$ can be introduced into the chimney by a tilting rearward movement of the lining. I represents an annular horizontal flange which is arranged above the upper end of the upright cylinder G and is separated therefrom by an air passage $i$. This flange is preferably supported on the cylinder G by posts $i^1$, Fig. 7, and the inner portion of the flange is preferably turned downwardly, as shown at $i^2$. K represents an air injecting cylinder which is arranged between the outer cylinder G and the chimney H and inside of the flange I, being separated from the latter by an air passage $k^1$. This cylinder is provided above the flange I with an upwardly-flaring portion $k^2$, which extends higher than the chimney H and is provided at its upper end with an inwardly-projecting flange L, which preferably rises inwardly and which is provided with air inlet openings $l$. M represents a cylindrical collar which extends downwardly from the inner edge of the flange L to a point at a suitable distance below the top of the chimney H. This collar M is separated from the chimney by an annular air passage $m$ and from the surrounding injecting cylinder K by an annular air passage $m^1$. N represents the usual top plate or cap, which is supported at a suitable distance above the flange L by posts $n$ or other suitable means to form openings $n^1$ for the escape of the products of combustion. The parts of the lantern top are preferably supported, as shown, upon the body wall A by the outer cylinder G, which is secured to said body. The injecting cylinder is secured to the cylinder G by any suitable means, for instance, arms $o$, Fig. 13. The injecting collar M is secured to the cylinder K by the flange L, and the chimney H is secured to the collar N by arms $o^1$, Fig. 12. Other suitable fastening means may, however, be employed, if desired.

In the operation of this lamp or lantern the products of combustion pass upwardly through the chimney H and collar M and escape through the openings underneath the top plate N. Air currents which pass through the space between the top plate N and the flange L may be more or less deflected in a downward direction. If such a current strikes against the inner side of the collar M, it is deflected thereby into the annular space $m$ between the collar and the chimney H, and so reaches the descending passage $g$, between the chimney and the outer cylinder G, and flows to the burner. Such air currents entering the top portion of the lantern are by this means prevented from blowing down the chimney with full force, whereby the flame would be caused to smoke, or in extreme cases extinguished. Air currents which strike against the upper sloping flange L are injected into the passage $m^1$ between the collar M and the injecting cylinder K and pass into the passage $g$. Air currents which strike against the upper downwardly-tapering portion $k^2$ of the cylinder K are deflected downwardly thereby and enter the passage $g$ through the space $k^1$. Air currents which strike against the under side of the flange I enter the passage $g$ through the space $i$. All of these currents tend to pass downwardly through the passages $g$ and $a$ and maintain the flow of air in the proper direction to sustain the flame; but if an excessive blast should enter these passages it can vent itself in an upward direction through these various inlets, particularly on that side of each inlet which is not exposed to the direct force of the blast. A copious supply of fresh air in the proper direction to support the flame is by these devices maintained under all conditions of movement of the lamp or lantern and of exposure to air currents, while an excessive supply of air to the flame and injurious downward blasts in the chimney are prevented. The lantern or lamp is thereby enabled to sustain a bright and steady flame at all times.

The lower portion of the lamp, in which the oil pot and burner are arranged, is constructed as follows: P represents the oil pot, having the usual collar $p$, in which is seated the burner $p^1$, having the usual perforated gallery $p^2$, Figs. 6 and 8. $p^3$ is the cylindrical wall of the air chamber, which surrounds the collar $p$. $P^1$ represents the burner cone, resting, as usual, by a shoulder upon the perforated gallery $p^2$ and having a skirt $p^4$ resting upon the wall $p^3$ of the air chamber and provided above the latter with air passages or perforations $p^5$. The burner cone projects upwardly through an opening in the lower portion of the inner wall or lining B of the lamp or lantern, and this opening is preferably formed in a raised substantially horizontal annular diaphragm $q$, secured in the lower portion of the lining B. This diaphragm preferably fits snugly around the burner cone and is provided with perforations $q^1$, through which a limited amount of air passes from the passage $a$ to the space within the lining B, which forms the flame-chamber. R represents the lower collar or body hoop of the lantern, which preferably flares downwardly and which receives the removable oil pot P. This body hoop is provided in its upper portion with an upwardly-tapering or conical annular diaphragm $r$, into which the skirt of the burner cone projects in such manner that the perforations $p^5$ of the cone are located above this lower diaphragm $r$ and below the upper diaphragm $q$. When the oil pot and burner are attached to the body of the lamp or lantern the air passes from the descending annular passage $a$ into the space between the upper diaphragm $q$ and the lower diaphragm $r$. The main portion of the air passes from the space through the perforations $p^5$ in the skirt of the burner cone into the chamber $p^6$ and from the latter through the perforated gallery $p^2$ to the interior of the burner cone. A comparatively small portion of the air supplied through the passage $a$ passes through the perforations of the upper diaphragm $q$ into the interior of the lamp body outside of the burner cone. This air prevents overheating of the flame chamber and also aids in perfecting the combustion. The flame-chamber of this lamp or lantern is a horizontal cylinder or housing having double walls which are connected at the front and rear, forming a descending annular air passage which receives the supply of air from above and delivers it below the burner cone. The latter communicates with the lower portion of this air passage and projects into the flame-chamber. This chamber is open at the front and rear and has at its rear a movable reflector and at the front a movable frame containing the front glass. Upon opening this flame-chamber at the front or rear the interior of the chamber can be reached without disturbing the integrity of the air passages. When the flame-chamber has been opened at the rear, the surfaces of the chamber and of the rear reflector can be conveniently reached for cleaning and other purposes.

The oil pot may be detachably secured to the lamp body by any suitable fastening devices. The preferred fastening devices which are shown in the drawings are constructed as follows: The oil pot is provided on its upper side with an upwardly-projecting marginal attaching collar S, Figs. 6 and 8, which fits with its enlarged upper portion $S^1$ snugly into the lower cylindrical portion $r^1$ of the body hoop R and is adapted to bear with its upper end against a shoulder $r^2$ at the upper end of the cylindrical portion $r^1$. The collar S is provided below the enlarged upper portion $S^1$ with an annular shoulder $S^2$.

T represents two horizontal locking bolts which are journaled tangentially in the lower portion $r^1$ of the body hoop on diametrically opposite sides thereof. These bolts are constructed on one side with a retreating or recessed portion of any suitable shape or construction, so that upon turning the bolts about their axes to present the retreating or recessed side inwardly they will not obstruct the interior of the cylindrical portion $r^1$ of the body hoop and permit the collar S of the oil pot to be freely inserted into the same or to be removed therefrom, while by turning the bolts out of this position portions of the bolts will project inwardly underneath the shoulder $S^2$ of the collar S and lock the latter to the body hoop. This result is conveniently produced by providing each bolt on one side with a concave recess $t$, Figs. 4, 5, 8 and 9, which is curved concentric with the inner side of the lower portion $r^1$ of the body hoop. When the bolts are so turned that these recesses are presented inwardly, as shown in Figs. 5 and 9, they do not project beyond the inner cylindrical surface of the body hoop, and the oil pot can be freely inserted or removed. In order to lock the oil pot to the body hoop, the bolts are given half a turn after the oil pot has been inserted. This causes the recessed side of each bolt to be presented outwardly and the solid portion of the bolt to project inwardly underneath the shoulder of the attaching collar S, Figs. 4 and 8. This shoulder has a beveled or curved lower face, and the bolts in turning from their unlocked to their locking position engage underneath this shoulder and force or wedge the collar and the oil pot upwardly and against a shoulder on the body hoop, which may be the internal shoulder $r^2$ of the body hoop against which the upper end of the attaching collar is adapted to bear, or the lower end of the body hoop against which the top of the oil pot, surrounding the base of the attaching collar, is adapted to bear, as represented in Figs. 6 and 8. When the bolts have been turned into their locking position, represented in Figs. 4 and 8, they grip the collar of the oil pot on diametrically opposite sides and also press the collar upwardly against the shoulder of the body hoop, whereby the oil pot is securely locked at opposite sides against up-and-down as well as sidewise movement and securely and tightly attached to the body of the lamp or lantern, so that the oil pot does not rattle in the body and the bolts are not liable to work loose under the vibrations of the vehicle to which the lamp is attached. As the attaching collar is made of sheet metal, it accomodates itself to a certain extent to the wedging or clamping action of the bolts. These rotary locking bolts are preferably journaled in housings or bearings $t^1$, secured tangentially to the outer side of the body hoop and cut away at the middle on the inner side to expose the middle portion of each locking bolt inwardly. The locking bolts are provided with handles $t^2$ of any suitable construction or form for turning the same, and these handles are preferably so arranged that they extend downwardly when the bolts are in their locking position. The movement of the handles to the locking position, represented in Figs. 1 and 2, is limited by the oil pot, which forms a stop to the turning movement of the handles and arrests that movement when the handles have reached the locked position. For inserting the oil pot into the lamp body the handles are turned upwardly out of their depressed position until the recessed portions of the locking bolts are turned inwardly, as represented in Fig. 9. These bolts form very simple, reliable and convenient locking devices, which securely attach the oil pot to the lamp body against accidental displacement and loss under the jolting and jarring which such lamps receive in use. The connection of the oil pot with the lamp body is made by simply inserting the oil pot into the lamp body by a straight or axial movement and then turning the locking bolts, thus avoiding any rotary or tipping movement of the oil pot and lamp body with reference to each other for making the attachment or disconnecting the parts. Instead of forming the retreating portion by recessing the body of the locking bolt, it may be formed by bending the same, as represented at $T^1$, Fig. 18.

The improvements described and shown herein are mainly designed for use in vehicle lamps or lanterns; but some of them are also applicable to other styles of lamps or lanterns, and in referring in the claims to lamps only for the sake of brevity I wish it to be understood that I include other analogous illuminating apparatus.

I claim as my invention:

1. The combination of a lamp body having a horizontal cylindrical flame-chamber which is open at the front and rear and which comprises an inner cylindrical wall and an outer cylindrical wall connected at their front and rear ends and forming between them a descending air passage which receives air at its upper end, a back movably attached to the open rear end of said body, a front frame movably attached to the open front end of said body, an oil pot secured to the lower portion of said body, and a burner on said oil pot which projects through said inner cylindrical wall into said flame-chamber and receives air from said air passage, substantially as set forth.

2. The combination of a lamp body having a horizontal cylindrical flame-chamber which is open at the front and rear and which comprises an inner cylindrical wall and an outer cylindrical wall connected at their front and rear ends and forming between them a descending air passage which receives air at its upper end, a back movably attached to the open rear end of said body, a reflector attached to said back and arranged at the open rear end of said body, a front frame movably attached to the open front end of said body, an oil pot secured to the lower portion of said body, and a burner on said oil pot which projects through said inner cylindrical wall into said flame-chamber and receives air from said air passage, substantially as set forth.

3. The combination of a lamp body having a horizontal cylindrical flame-chamber which is open at the front and rear, and which comprises an inner cylindrical wall and an outer cylindrical wall connected at their front and rear ends and forming between them a descending air passage which receives air at its upper end, a back movably attached to the open rear end of said body and provided with a rear reflector, and a front glass frame movably attached to the open front end of the body and provided with an annular reflector which is arranged within said frame and in front of said body, substantially as set forth.

4. A lamp having its top portion composed of a chimney, a surrounding wall forming therewith a descending air passage, an injecting wall arranged between the chimney and said surrounding wall and separated from the chimney and said surrounding wall by air inlet passages, and an injecting collar arranged between the upper portion of the chimney and said injecting wall and separated from the chimney and said injecting wall by air inlet passages, substantially as set forth.

5. A lamp having its top portion composed of a chimney, a surrounding wall forming therewith a descending air passage, an injecting wall arranged between the chimney and said surrounding wall and separated from the chimney and said surrounding wall by air inlet passages, an annular flange arranged above said surrounding wall and having an air inlet on its under side, and an injecting collar arranged between the upper portion of the chimney and said injecting wall and separated from the chimney and said injecting wall by air inlet passages, substantially as set forth.

6. A lamp having its top portion composed of a chimney, a surrounding wall forming therewith a descending air passage, an injecting wall arranged between the chimney and said surrounding wall and separated from the chimney and said surrounding wall by air inlet passages, an injecting collar arranged between the upper portion of the chimney and said injecting wall and separated from the chimney and said injecting wall by air inlet passages, and a perforated flange connecting the upper end of said injecting wall with the upper end of said injecting collar, substantially as set forth.

7. A lamp having its top portion composed of a chimney, a surrounding wall forming therewith a descending air passage, an annular flange arranged above said surrounding wall, an injecting wall which is arranged between the chimney and said surrounding wall and separated from said flange by an air inlet; said injecting wall being formed with an upwardly-flaring portion above said flange, and an injecting collar arranged between the upper portion of the chimney and said injecting wall, substantially as set forth.

8. A lamp having its top portion composed of a chimney, an injecting collar which surrounds the upper portion of the chimney and extends above the same, being separated therefrom by an air inlet passage, a wall surrounding the chimney and forming therewith a descending air passage with which said air inlet passage communicates, and air injecting means arranged outside of said injecting collar for injecting air into said descending air passage from above, substantially as set forth.

9. A lamp having its top portion composed of a chimney, a surrounding injecting collar extending above the same and separated therefrom by an air inlet passage, an injecting wall surrounding said injecting collar, an outer surrounding wall, and a flange arranged above said outer wall and separated from the same and from the injecting wall by air inlet passages, substantially as set forth.

10. A lamp having an annular diaphragm in the lower portion of its flame-chamber and having below the flame-chamber a body hoop provided with an annular diaphragm, means for supplying air to the space between said diaphragms, an oil pot adapted to be inserted into the body hoop from below, and a burner on the oil pot which projects with its cone through the openings of said diaphragms and has the lower end of its cone provided with air inlets in line with the space between the diaphragms, substantially as set forth.

11. The combination of a lamp body containing the flame-chamber and having a body hoop open at the bottom for the insertion of the oil pot and an internal bearing shoulder, an oil pot having an attaching collar which is inserted into the body hoop against said bearing shoulder and provided with an outwardly-overhanging locking shoulder, and rotatable locking bolts arranged tangentially in said body hoop on opposite sides of said collar and below the locking shoulder thereof and adapted to engage the collar on opposite sides and press the same upwardly against said bearing shoulder, said bolts being provided with retreating portions which, when presented inwardly, clear the shoulder of the collar, substantially as set forth.

12. The combination of a lamp body containing the flame-chamber and having a body hoop open at the bottom for the insertion of the oil pot and an internal bearing shoulder, an oil pot having an attaching collar which is inserted into the body hoop against said bearing shoulder and provided with an outwardly-overhanging locking shoulder, rotatable locking bolts arranged tangentially in said body hoop on opposite sides of said collar and below the locking shoulder thereof and adapted to engage the collar on opposite sides and press the same upwardly against said bearing shoulder, said bolts being provided with retreating portions which, when presented inwardly, clear the shoulder of the collar, handles on said bolts for turning the same, and a stop which arrests the movement of the handles in the locked position, substantially as set forth.

13. The combination with a lamp body containing the flame-chamber and having a body hoop which is open at the bottom and provided with a bearing shoulder for the oil pot, of an oil pot which is adapted to be engaged with the body hoop from below and to bear against said shoulder when attached to the lamp body, said oil pot being provided with an outwardly-overhanging locking shoulder, and rotatable locking bolts arranged tangentially in said body hoop on opposite sides of said locking shoulder and below the same, and adapted to engage said shoulder on opposite sides and press the same upwardly and seat the oil pot against said bearing shoulder, said bolts being provided with retreating portions which, when presented inwardly, clear the shoulder of the oil pot and permit the latter to be attached or removed, substantially as set forth.

14. The combination with a lamp body containing the flame-chamber and having a body hoop which is open at the bottom and provided with a bearing shoulder for the oil pot, of an oil pot which is adapted to be engaged with the body hoop from below and to bear against said shoulder when attached to the lamp body, said oil pot being provided with an outwardly-overhanging locking shoulder, rotatable locking bolts arranged tangentially in said body hoop on opposite sides of said locking shoulder and below the same, and adapted to engage said shoulder on opposite sides and press the same upwardly and seat the oil pot against said bearing shoulder, said bolts being provided with retreating portions which, when presented inwardly, clear the shoulder of the oil pot and permit the latter to be attached or removed, handles on said bolts for turning the same, and a stop which arrests the movement of the handles in the locked position, substantially as set forth.

Witness my hand in the presence of two subscribing witnesses.

CHARLES BERGENER.

Witnesses:
EDWARD WILHELM.
GEO. W. HAM.